Feb. 10, 1959 B. OSTENDORF, JR 2,873,385

TRANSISTOR DATA STORAGE AND GATE CIRCUIT

Filed Oct. 6, 1955

INVENTOR
B. OSTENDORF, JR.
BY John E. Cassidy
ATTORNEY 2,873,385
Patented Feb. 10, 1959

2,873,385

TRANSISTOR DATA STORAGE AND GATE CIRCUIT

Bernard Ostendorf, Jr., Stamford, Conn., assignor to Bell Telephone Laboratories, Incorporated, New York, N. Y., a corporation of New York Application October 6, 1955, Serial No. 538,937

7 Claims. (Cl. 307—88.5)

This invention pertains to electrical circuits in communication systems, such as in telemetering systems, for temporarily storing intelligence. In high speed telegraph and telemetering systems, there is need for instrumentalities in which data in the form of electrical conditions may be stored while it is being received, for instance, or at a later operating stage, before it is applied to a succeeding operating stage in the system. The present invention is an improved circuit for performing this function.

An object of the invention is the improvement of circuits for storing data in the form of electrical conditions in high speed telegraph or telemetering systems.

The invention may be understood from the following description when read with reference to the associated drawings in which a preferred embodiment of the invention is presently incorporated. It is to be understood, however, that the invention is not limited to the present embodiment, but may be practiced with other embodiments which may be suggested to those skilled in the art by a consideration of the following:

In the drawings—

Figure 1:
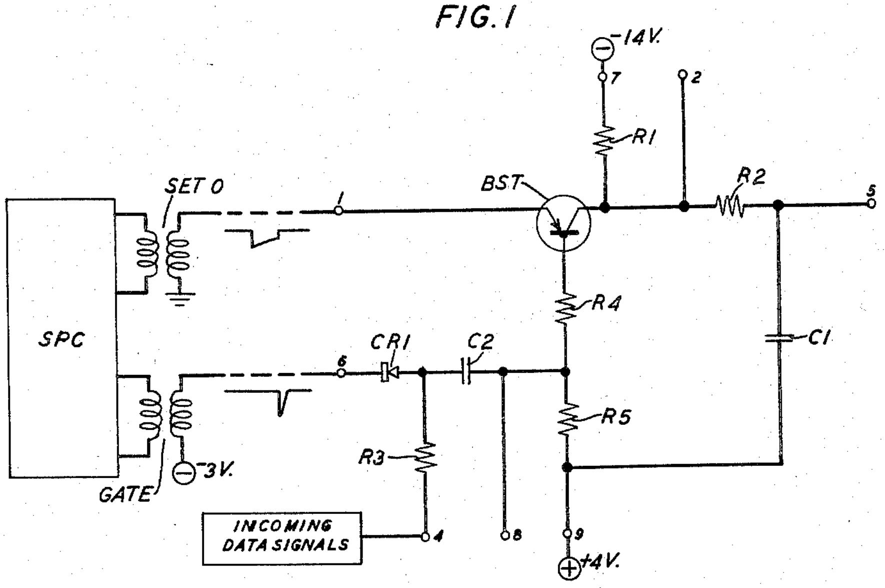
Fig. 1 shows the circuit of the invention.

In the following, the values of constants are cited by way of example as an aid in understanding the invention. It is to be understood that the cited values are not limitations.

The small circles with the negative and positive symbols therein appearing on the drawing represent grounded negative battery and grounded positive battery, respectively.

An important feature in Fig. 1 is a bistable transistor circuit having a single transistor. By this is meant a transistor circuit, having only one transistor, which can be controlled so as to alternately assume a high-current condition or a low-current condition. Having assumed one or the other condition, the transistor remains stable in the condition assumed until actuated to assume the alternate condition.

Transistors are well known in the art, being described, for instance, in (1) The Physical Review, July 15, 1948, issue, pages 230 through 233; (2) The Bell System Technical Journal issue of July 1949, in an article entitled "Some Circuit Aspects of the Transistor," and in Patents 2,524,035, granted to J. Bardeen and W. Brattain, October 3, 1950, and 2,579,336, granted to A. J. Rack, December 18, 1951.

Another feature of Fig. 1 is a diode gate circuit for controlling the bistable transistor.

The bistable transistor when in one condition represents one of the two conditions of a signal element in a multielement two-condition permutation code signal combination. The code may be a binary code in which each signal element may be of either of two conditions representing a 1 or a 0 in a binary number. The low-current state of the transistor may arbitrarily represent 0 and the high-current state may represent 1 of the binary digit.

Figures 2, 3:
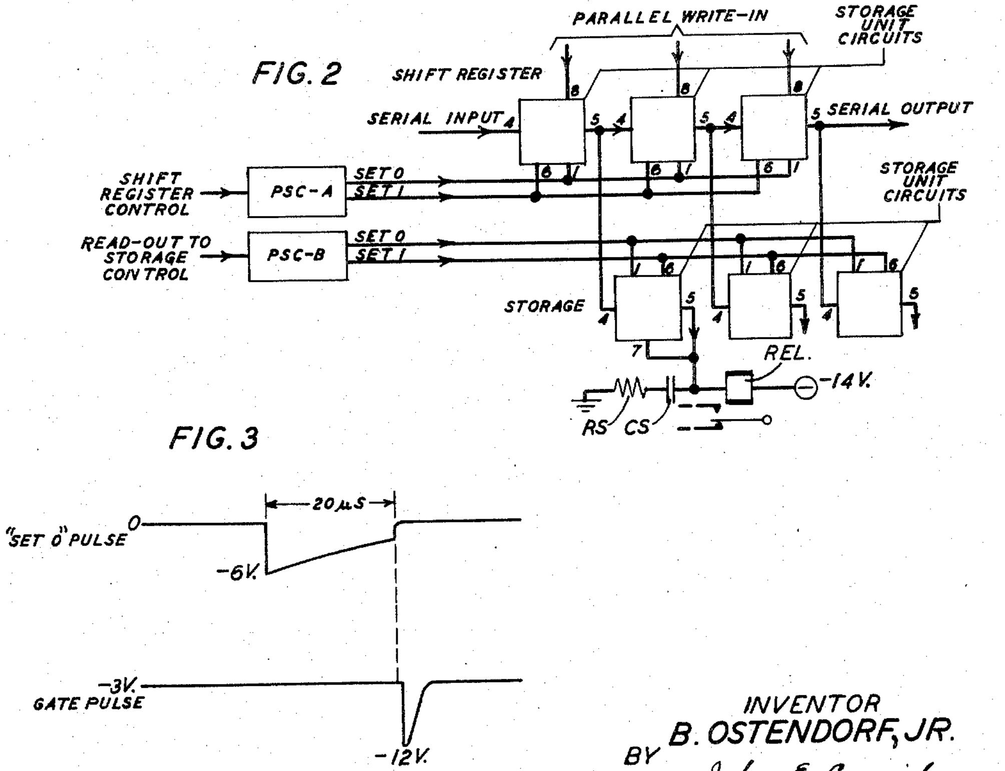
Fig. 2 shows, largely in the form of captioned rectangles, a system in which the circuits of Fig. 1 are incorporated.
Fig. 3 shows a diagram of wave forms used in explaining the invention.

The circuit of Fig. 1 is connected on its left-hand side to a source of pulses generated by a shift pulse circuit SPC. One embodiment of a shift pulse circuit suitable for service with the present circuit is disclosed in a patent application Serial No. 538,903, filed by the present applicant on the same date as that of the present application, which application is hereby incorporated by reference as though fully set forth herein. The pulses are as shown in Fig. 3. There are two different pulses. One of the two pulses, designated the set 0 pulse, is a negative pulse of 20 microseconds duration, shaped as shown in the upper curve of Fig. 3 and having a maximum negative value of minus 6 volts. The other of the two pulses, called the gate pulse, also called the set 1 pulse, is shaped as shown in the bottom curve of Fig. 3. It too is a negative pulse of shorter duration lasting about 2 microseconds, starting from a minus 3 volt base, and having a maximum negative value of minus 12 volts. It occurs, as indicated in Fig. 3, immediately after the set 0 pulse.

The set 0 pulse is applied through the SET–0 transformer to the emitter of the bistable transistor BST, and it sets the bistable transistor in its low current or 0 condition. The gate pulse, or set 1 pulse, is applied through the transformer Gate and the diode gate circuit and may or may not set the transistor BST in its high current or 1 condition depending upon other potential conditions applied to the gate to be made clear hereinafter.

Refer now to Fig. 1. The transistor BST in this figure operates as mentioned on a bistable basis. The base load, comprising resistors R4 and R5, connects to a source of positive potential, such as plus 4 volts with respect to ground. The direct-current collector load resistor R1 connects to a grounded source of negative potential, such as minus 14 volts. The emitter is returned to ground through the secondary winding of the SET–0 transformer. The occurrence of the set 0 pulse from this transformer lowers the emitter potential below that of the base for a sufficient time to insure that the transistor BST will remain in the low current or 0 condition after the emitter returns to ground potential. The circuit is triggered to the high current or 1 condition by a negative pulse on the base. The voltage at the collector is about minus 13 volts, for instance, for the 0 condition and about minus 1 volt, for instance, for the 1 condition.

Attention is now particularly directed to the gate portion of the circuit of Fig. 1. The gate consists of diode CR1, capacitor C2 and resistor R3. The gate is cooperatively controlled by the set 1 pulse from transformer Gate applied through terminal 6 to the left-hand terminal of diode CR1 and by the incoming data pulses which apply two different potential conditions, the first for a 0 condition and the second for a 1 condition, through terminal 4 and resistor R3 to the right-hand terminal of the diode CR1. The set 1 pulse through transformer Gate occurs just after the end of the set 0 pulse. The pulse has a direct-current base of minus 3 volts, for instance, and as mentioned, reaches a maximum negative value of about minus 12 volts, for instance. When terminal 4 is at minus 1 volt, diode CR1 becomes conducting during the set 1 pulse and the pulse is applied to the base of the transistor BST through the low impedance of capacitor C2. When terminal 4 is at minus 13 volts, the diode CR1 remains biased in the reverse direction during the set 1 pulse and the amount of the pulse which reaches the base is too small to cause triggering.

To amplify the foregoing and to explain broadly a system in which the present storage circuit may advantageously be incorporated, it is pointed out that the circuit of Fig. 1 is a storage circuit operable to either of two conditions under joint controls. The first control is a local source of pulses, the shift pulse circuit SPC, which generates two pulses. One of these pulses is always effectively applied to transistor BST and sets it in the 0 condition. That is to say, each stored signal element always begins as a 0. If it is in fact to be a 0, as determined by the corresponding data signal element of a train of signal elements being received and applied to Fig. 1 through terminal 4, the potential applied at terminal 4 blocks the set 1 pulse. If the received signal element defines a 1 rather than a 0, the potential produced and applied to terminal 4 responsive to the corresponding signal element is such that the gate is opened, the set 1 pulse is passed to transistor BST and stored.

The shift pulse circuit SPC may be thought of as a local control which, under the influence of a timer, such as an oscillator and counter for instance, controls the storage circuit. The data which is to be stored in Fig. 1 is a selected one condition of a two-condition signal element of a multidigit two-condition permutation code telegraph signal combination. The entire permutation code signal combination may represent a symbol, such as a letter or number, or it may represent a function. It may, as has been mentioned, represent the 0 or 1 condition of a multidigit binary number which in its entirety defines a quantity.

The telegraph system in which the present circuit is employed may advantageously be a start-stop system in which each signal combination is a train of signals having a start signal element followed by a predetermined unchanging number of intelligence bearing signal elements and finally a stop signal element. The duration of each signal element and of the total train is the same for all elements and for all trains. The signal trains may be generated at the transmitter under control of an oscillator, for instance, and a counter, which together determine the duration of each signal element of the train and the number of signal elements in each train, both of which remain fixed and unchanging.

At the receiver, an oscillator, operating at the same frequency as the oscillator in the transmitter, and a counter, counting the same number of pulses for each train as the counter at the transmitter, are set into operation under control of the start signal element in each train preceding the intelligence bearing signal elements. This oscillator and counter at the receiver then time the duration of each signal element and count the number of elements in each train. The shift pulse circuit SPC is controlled by the receiving oscillator and counter in response to the incoming signals. It generates the set 0 pulse during the early portion of the interval while each signal element is being received and it also later generates a set 1 pulse which permits the storage circuit of Fig. 1 to be set at 1 if the signal element which is being received and applied to terminal 4 is in fact a 1 and not a 0.

It has been explained that the code combinations transmitted and received are multielement combinations which may, for instance, comprise 13 elements or more or less, sometimes as many as 50 or more, each of which may be of either of two conditions. It has also been explained that the storage unit circuit of Fig. 1 can store only one element at any one time. To store all of the elements of a multi-element combination will require as many storage units, such as that in Fig. 1, as there are elements in the combination. How this is done will now be explained.

Refer now to Fig. 2 which is arranged to store a plurality of signal elements. In Fig. 2, each square represents a single storage circuit unit such as shown at the right in Fig. 1. The upper portion of Fig. 2 represents a step register, or step storage circuit, to which the signal elements of an incoming combination which are being received consecutively are applied in sequence. The input is designated "serial input" and is applied to terminal 4 of the left-hand storage unit. The output of the first unit is from terminal 5 which connects to terminal 4 of the second unit and so on. It is to be understood that the numbering of the terminals of the storage units in Fig. 2 is the same as the numbering of the terminals of Fig. 1. The conductor connected to terminal 5 of the right-hand unit designated "serial output" is the output conductor for the system when it is arranged to produce an output serially or element by element.

In an arrangement in which the signal elements of a combination are transmitted and received in sequence, the incoming data signals are applied to the first of the group of storage units connected in tandem as in the upper portion of Fig. 2. Each incoming signal element is first stored in the left-hand storage circuit of Fig. 2 and is transferred progressively to succeeding storage units as succeeding signal elements of a train are received. In the upper portion of Fig. 2, only three storage units are shown arranged in tandem. Any number required may be similarly arranged.

At the end of reception of a 13 element combination, for instance, a 13 unit storage circuit, assuming that the signals enter at the left and progress toward the right, if sensed from right-to-left, will be in the 0 or 1 condition corresponding to the elements of the transmitted combination.

The secondary of a transformer, not shown in pulse shift circuit PSC–A but corresponding to transformer SET–0 in Fig. 1, is connected in parallel to terminals 1, and the secondary of a transformer, not shown in pulse shift circuit PSC–A but corresponding to transformer Gate in Fig. 1 through which the set 1 pulses pass, is connected in parallel to terminal 6 of each one of the storage units. The set 0 pulse when applied to terminal 1 of any storage unit sets the unit at 0. However, it is necessary to arrange so that the following set 1 pulse, when applied to terminal 6 of any storage unit, be permitted to pass in response to the potential condition of terminal 5 of a storage unit in the next preceding stage in which a 1 condition has been stored during the last preceding cycle. Under such condition, the stored 1 condition is passed through terminal 4 of the next succeeding storage unit so as to register the 1 in the next succeeding unit. To explain how this is done, it is necessary now to again refer in detail to Fig. 1.

It is necessary to delay the obliteration of a 1 in any storage unit until after the next succeeding unit has been set to 0. This is a function of the delay circuit comprising resistor R2 and capacitor C1 in the output circuit aided by the delay in capacitor C2 in the succeeding Fig. 1 to which output terminal 5 is connected through input terminal 4. These delays cooperatively maintain the potential condition characteristic of a 1 in a storage unit until after the set 0 pulse has been registered in the next succeeding storage unit.

Terminal 8 in Fig. 1, which connects directly to the base of transistor BST, short circuits capacitor C2 interposed between the gate and the base of transistor BST. This permits pulses to be applied directly to the storage units and is employed in another type of operation of the storage units known as parallel write-in. In this type of operation, all of the elements of a multielement two-condition signal combination may be applied simultaneously to the multiunit storage circuit, each signal element on an individual storage unit. In such operation, the set 0 pulse from the shift pulse circuit SPC is first applied simultaneously to all storage units, setting all at 0. Then such of them as are to be changed to the 1 condition have a distinctive potential, characteristic of the 1 condition, applied to their terminals 8 simultaneously and 1's will be registered in such units. The others will remain in the 0 condition.

Fig. 2 also shows an arrangement whereby the condition stored in each unit of the upper tandem arrangement may be simultaneously transferred to an individual storage unit for each storage element of the tandem arrangement, under control of another pulse shift circuit FSC–B which is activated at a predetermined instant under control of the receiving oscillator and counter. Pulse shift circuit PSC–B would, at the predetermined moment, set all of the individual storage units in the lower row in Fig 2 to 0 and then supply a set 1 pulse in parallel to each. Such of the storage units in the upper row in Fig. 2 as have a 0 registered therein would apply such a potential condition from its terminal 5 to the terminal 4 of its associated storage unit in the lower row as to prevent the passage of the set 1 pulse applied from pulse shift circuit PSC–B. Such of the storage units in the upper row as have a 1 stored therein would apply such a potential condition as would permit the 1 to be stored.

Fig. 2 at the bottom shows the manner of connecting a relay winding to the output of a storage device so as to operate the relay REL and record the stored condition. In this arrangement, terminals 5 and 7 of the storage unit are first connected together and then through the winding of relay REL to the negative voltage source, minus 14 volts, for instance. A resistor RS and a capacitor CS, connected in series, shunt the winding of relay REL to cancel out its inductive reactance and thus permit the bistable circuit to be triggered in the normal manner.

What is claimed is:

1. A shift register unitary storage circuit for storing electrical conditions defining the condition of a single signal element in a multielement permutation code signal combination, said circuit comprising a single transistor and a single diode, means connected to said transistor for first setting said transistor in a first current carrying condition at the beginning of each signal interval to connote a first condition of a signal element, and means including said diode, responsive to the application of a signal element of a second condition thereto during any signal interval for changing said transistor to a second current carrying condition during the remainder of said signal interval to connote said second signal condition.

2. A storage circuit for storing either of two electrical conditions during a single signal interval, said circuit being a bistable transistor circuit having a total of one transistor and a total of one diode, a first and a second control for said transistor circuit, means for applying a first pulse through said first control on said transistor, means responsive to the application of said pulse for setting said transistor in a first current condition to connote a first signal condition, means jointly responsive to the application of a second pulse through said second control on said diode and the application of an incoming signal element of a first condition on said diode for maintaining said first current condition of said transistor throughout a signal interval, and means jointly responsive to the application of said second pulse through said second control on said diode and the application of a signal of a second condition on said diode for changing said first current condition of said transistor to a second current condition for the remainder of said signal interval to connote a second signal condition.

3. A bistable transistor shift register circuit having means therein for registering all of the signal elements of a multi-element two-condition permutation code signal combination, said circuit having an individual stage for each element of said combination, each of said stages having a total of one transistor and a total of one diode gate, said means comprising a pulsing circuit connected to all of said stages in parallel, said pulsing circuit having means for impressing a first pulse followed by a second pulse on all of said stages in parallel during each signal interval, means responsive to said first pulse for setting all of said transistors in a uniform first current carrying condition and means, comprising said diode gate, jointly responsive to said second pulse and the impressing of incoming signal elements on said stages in series for selectively setting certain of said transistors in a second current carrying condition.

4. A storage circuit having input means therein for selectively impressing thereon a signal element of either of two conditions during a single signal interval, a pulsing circuit connected to said storage circuit, said pulsing circuit having means for impressing a first pulse on said storage circuit during said signal interval, means in said storage circuit responsive to said first pulse for establishing a first storage condition during said interval, a single diode gate intermediate said pulsing circuit and said storage circuit, means in said pulsing circuit for later impressing a second pulse on said gate during said signal interval, means responsive to the impressing on said input means of a first condition of said signal element for inhibiting the passage of said second pulse through said gate to said storage circuit, so as to maintain said first storage condition in said circuit throughout said signal interval, means responsive to the impressing on said input means of a second condition of said signal element for permitting the passage of said second pulse through said gate to said storage circuit, and means, responsive to said passage of said second pulse, for replacing said first storage condition with a second storage condition in said storage circuit, before said interval has ended.

5. A storage circuit in accordance with claim 4, said circuit having a total of one transistor, said transistor operable to high and low current conditions for said first and said second storage conditions, respectively.

6. A storage circuit having storage means therein for selectively storing a first and a second electrical condition to denote a first and a second condition of a single signal element, said storage means having a total of one transistor and a total of one diode gate, dual input means responsive to the impressing on said circuit of said first and said second condition of said signal element for actuating said transistor to its high and its low current condition, respectively, one of said dual means being said diode gate, means connected to said diode gate for selectively inhibiting the passage of a pulse to said transistor incident to the condition of an incoming signal element, an output circuit connected to said storage means and means in said output circuit for protracting the effect of an established storage condition after the end of a signal interval.

7. A first storage circuit in accordance with claim 6, a second storage circuit connected in tandem thereto, means for passing said protracted effect on to said second storage circuit after the terminaton of said signal interval, and means in said second storage circuit responsive to said effect for storing a condition indicative of the effect.

References Cited in the file of this patent

UNITED STATES PATENTS

| | | |
|---|---|---|
| 2,594,336 | Mohr | Apr. 29, 1952 |
| 2,644,896 | Lo | July 7, 1953 |

OTHER REFERENCES

Pro. of the I. E. E. (Great Britain), October 1954, vol. 101, No. 83 (Part 11), pp. 572–3, "The Transistor Regenerative Amplifier as a Computer Element."

The Proceedings of the Institution of Electrical Engineers, vol. 101, No. 73, part 111, October 1954, pp. 298–307.